US009600871B2

United States Patent
Tsukagoshi

(10) Patent No.: US 9,600,871 B2
(45) Date of Patent: Mar. 21, 2017

(54) IMAGE CORRECTING APPARATUS, IMAGE CORRECTING METHOD AND COMPUTER READABLE RECORDING MEDIUM RECORDING PROGRAM THEREON

(71) Applicant: CASIO COMPUTER CO., LTD., Shibuya-ku, Tokyo (JP)

(72) Inventor: Takeshi Tsukagoshi, Hamura (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 14/833,274

(22) Filed: Aug. 24, 2015

(65) Prior Publication Data

US 2016/0071250 A1    Mar. 10, 2016

(30) Foreign Application Priority Data

Sep. 9, 2014   (JP) ................. 2014-183576

(51) Int. Cl.
| | |
|---|---|
| *G06K 9/40* | (2006.01) |
| *G06K 9/00* | (2006.01) |
| *G06T 5/00* | (2006.01) |
| *H04N 1/387* | (2006.01) |
| *H04N 19/162* | (2014.01) |

(52) U.S. Cl.
CPC .......... *G06T 5/006* (2013.01); *G06K 9/00248* (2013.01); *H04N 1/3878* (2013.01); *G06T 2207/30201* (2013.01); *H04N 19/162* (2014.11)

(58) Field of Classification Search
CPC . G06T 5/006; G06T 7/60; G06T 2207/20004; G06K 9/00248; H04N 19/162; H04N 1/3878
USPC .......................................... 382/118, 274–275
See application file for complete search history.

(56) References Cited

U.S. PATENT DOCUMENTS

| | | | |
|---|---|---|---|
| 7,991,200 B2* | 8/2011 | Ito ....................... | G06K 9/00248 382/115 |
| 8,218,899 B2* | 7/2012 | Yamazaki .......... | G06K 9/00228 382/118 |
| 9,230,184 B2* | 1/2016 | Sugimoto .......... | G06K 9/00228 |
| 2005/0271295 A1* | 12/2005 | Tabata .................... | G06T 5/008 382/274 |

FOREIGN PATENT DOCUMENTS

JP   2011-128913   6/2011

* cited by examiner

*Primary Examiner* — Kanjibhai Patel
(74) *Attorney, Agent, or Firm* — Amin, Turocy & Watson LLP

(57) ABSTRACT

According to an embodiment of the present invention, an imaging apparatus includes an image acquiring unit, an image correcting unit, and a correction preprocessing unit. The image acquiring unit acquires an image. The image correcting unit performs distortion correction for the image acquired by the image acquiring unit. The correction preprocessing unit determines an inclination of a face of a person in the image acquired by the image acquiring unit. Further, the correction preprocessing unit performs control so that the image correcting unit performs distortion correction of the image at an intensity according to the determined inclination of the face.

14 Claims, 7 Drawing Sheets

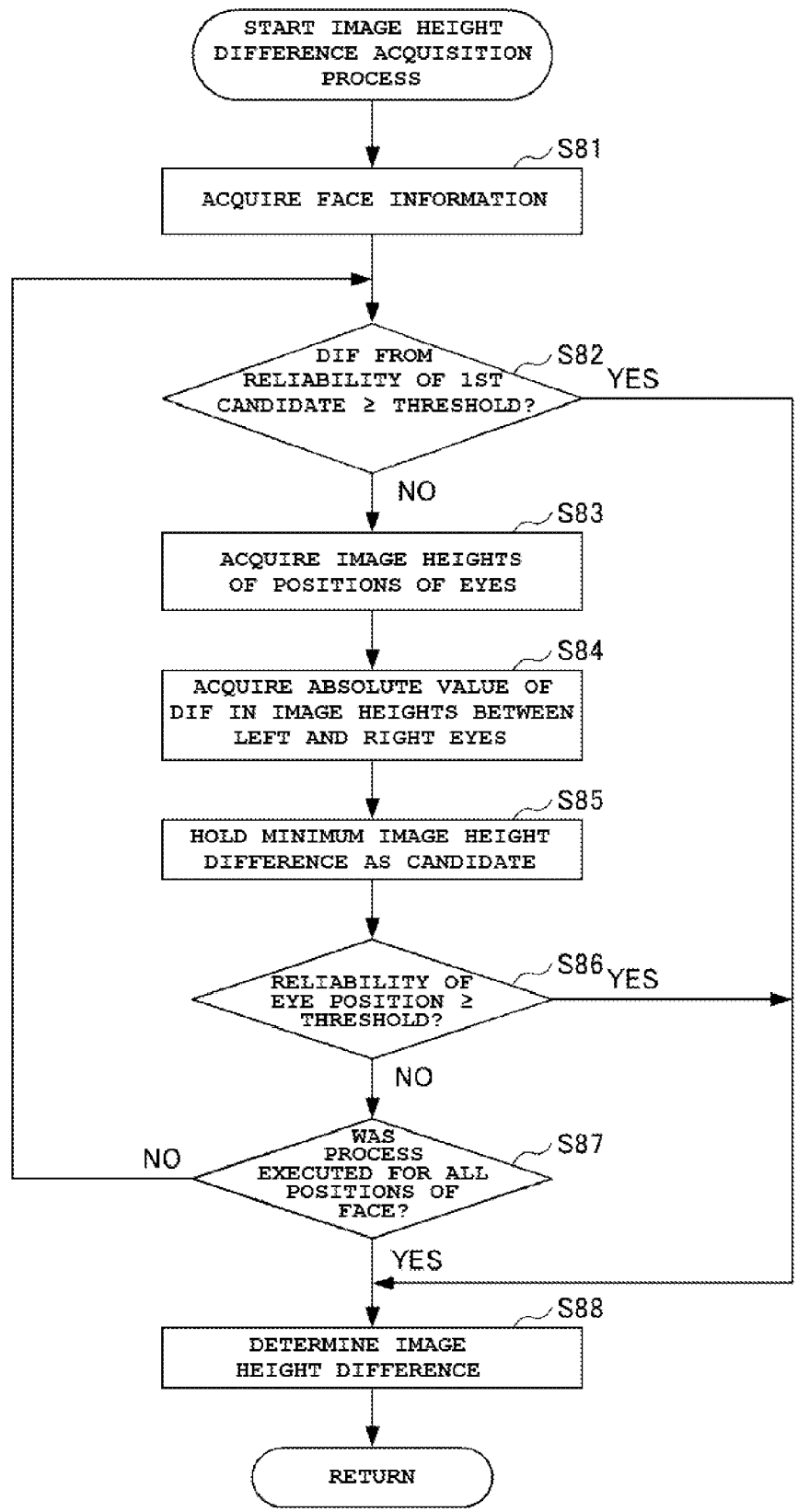

IMAGE CORRECTING APPARATUS, IMAGE CORRECTING METHOD AND COMPUTER READABLE RECORDING MEDIUM RECORDING PROGRAM THEREON

CROSS-REFERENCE TO RELATED APPLICATIONS

This application is based upon and claims the benefit of priority under 35 USC 119 of Japanese Patent Application No. 2014-183576 filed on Sep. 9, 2014 the entire disclosure of which, including the description, claims, drawings, and abstract, is incorporated herein by reference in its entirety for all purposes.

BACKGROUND OF THE INVENTION

1. Field of the Invention

The present invention relates to an image correcting apparatus, an image correcting method and a computer readable recording medium for recording a program for executing the method.

2. Description of the Related Art

Conventionally, there has been known a technology for performing distortion correction in order to reduce distortion of images due to distortion aberration of lenses. For example, Japanese Patent Application Laid-Open Publication No. 2011-128913 published on Jun. 30, 2011 discloses a technology for lowering a degree of distortion correction according to positions of a subject's image in a photographic range.

SUMMARY OF THE INVENTION

According to an embodiment of the present invention, an image correcting apparatus is provided. The image correcting apparatus includes an acquiring section configured to acquire an image, a correcting section configured to perform distortion correction for the image, a first determining section configured to determine an inclination of a face of a person in the image, and a control section configured to control the correcting section to perform the distortion correction for the image at an intensity according to the inclination of the face determined by the first determining section.

According to an embodiment of the present invention, an image correcting method is provided. The image correcting method includes acquiring an image, performing distortion correction for the acquired image, determining an inclination of a face of a person in the acquired image, and performing control so that the distortion correction is performed for the image at an intensity according to the determined inclination of the face.

According to an embodiment of the present invention, a non-transitory computer-readable recording medium for recording a program readable by a computer is provided. The program causes the computer to perform steps of acquiring an image, performing distortion correction for the acquired image, determining an inclination of a face of a person in the acquired image, and performing control so that the distortion correction is performed for the image at an intensity according to the determined inclination of the face.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

Here:

FIG. 7 is a flow chart for showing an image height difference acquisition process in the distortion correction process.

DETAILED DESCRIPTION OF THE PREFERRED EMBODIMENT

Hereinafter, embodiments of the present invention will be described with reference to the accompanying drawings.

Figure 1:
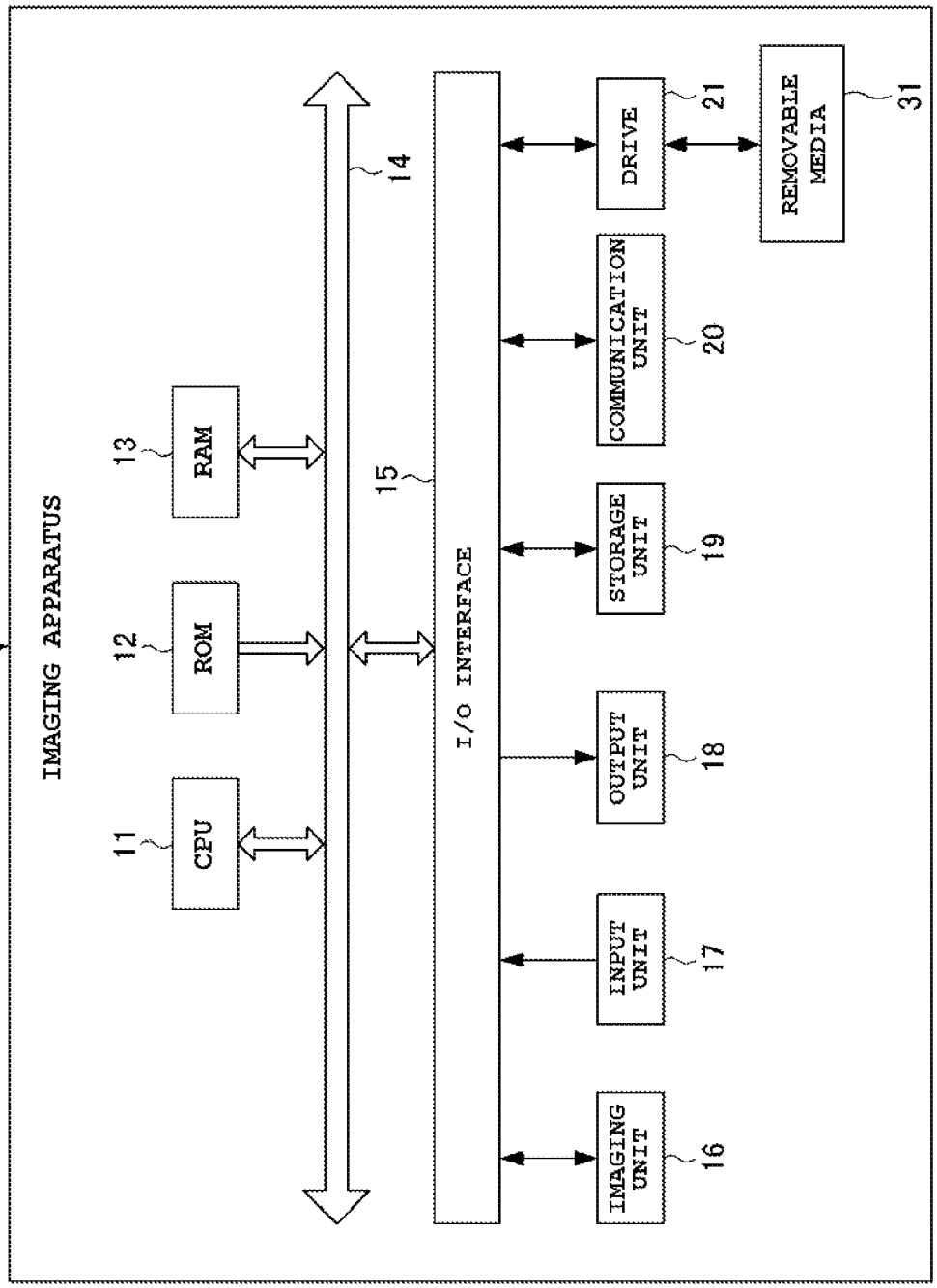
FIG. 1 is a block diagram showing a hardware configuration of an imaging apparatus according to an embodiment of the present invention.

FIG. 1 is a block diagram showing a hardware configuration of an imaging apparatus 1 according to an embodiment of the present invention.

For example, the imaging apparatus 1 is realized by a digital camera.

The imaging apparatus 1 includes a CPU (Central Processing Unit) 11, a ROM (Read Only Memory) 12, a RAM (Random Access Memory) 13, a bus 14, an I/O interface 15, an imaging unit 16, an input unit 17, an output unit 18, a storage unit 19, a communication unit 20, and a drive 21.

The CPU 11 executes various processes according to programs stored in the ROM 12 or loaded in the RAM 13 from the storage unit 19.

In the RAM 13, there are stored data necessary for the CPU 11 to execute various processes, and the like.

The CPU 11, the ROM 12 and the RAM 13 are connected to each other via the bus 14. The I/O interface 15 is also connected to the bus 14. The imaging unit 16, the input unit 17, the output unit 18, the storage unit 19, the communication unit 20, and the drive 21 are connected to the I/O interface 15.

The imaging unit 16 includes an optical lens unit and an image sensor (not shown in the drawing).

The optical lens unit includes lenses for collecting light to photograph a subject such as a focus lens and a zoom lens.

The focus lens forms an image of a subject on a light-receiving surface of the image sensor. The zoom lens freely changes the focal length within a predetermined range.

Further, the optical lens unit is provided with a peripheral circuit to adjust parameters such as focusing, exposure, and/or white balancing, as necessary.

The image sensor includes a photoelectric conversion element, an AFE (Analog Front End), and the like.

The photoelectric conversion element includes a CMOS (Complementary Metal Oxide Semiconductor) type photoelectric conversion element, for example. The subject's image is input to the photoelectric conversion element from the optical lens unit. The photoelectric conversion element performs photoelectric conversion (image capturing) of the subject's image and accumulates image signals for a predetermined period of time. The photoelectric conversion element provides the AFE with the accumulated image signals sequentially.

The AFE executes various signal processing operations such as A/D (Analog/Digital) conversion on the analog image signals. Digital signals are generated by the signal processing operations and output as output signals of the imaging unit 16.

The output signal of the imaging unit 16 is hereinafter referred to as "data of a captured image". The data of the captured image is supplied to the CPU 11.

The input unit 17 includes various buttons, and a variety of information is input via the input unit 17 in response to manipulation by a user.

The output unit 18 includes a display, a speaker, or the like, and outputs images or voices.

The storage unit 19 includes a hard disk, a DRAM (Dynamic Random Access Memory), or the like, and various image data is stored therein.

The communication unit 20 controls communication with different devices (not shown in the drawing) via a network such as Internet.

A removable media 31 including a magnetic disk, an optical disk, a magneto-optical disc, a semiconductor memory, or the like, is mounted on the drive 21. A program read out from the removable media 31 by the drive 21 is installed in the storage unit 19 as necessary. Similarly to the storage unit 19, the removable media 31 stores various data such as the image data stored in the storage unit 19.

The imaging apparatus 1 configured as above has a function of correcting distortion aberration of lenses (hereinafter, referred to as "aberration correction") and adding a slim face effect by performing correction according to an inclination of a face of a person in a captured image. Thus, the imaging apparatus 1 has a function of performing image correction suiting a user's taste according to situations of a subject's image in a photographic range.

Figure 2:
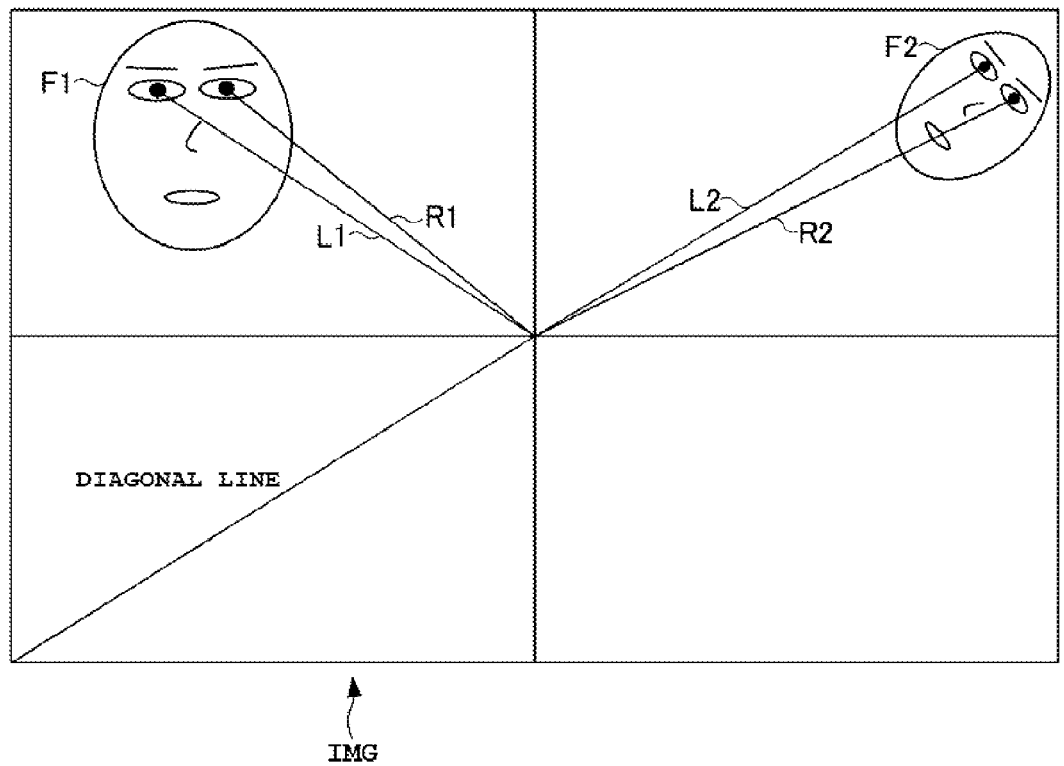
FIG. 2 is a schematic diagram for explaining the concept of image correction according to the embodiment.

FIG. 2 is a schematic diagram for explaining the concept of image correction according to the embodiment.

In the present embodiment, the image correction is performed in consideration of an inclination of a person's face in a captured image. As shown in FIG. 2, the inclination is specified by a difference between distances from the center of an image IMG to the eyes of a person which is a subject of the image IMG. The distance from the center of the image to an eye and the difference between the distances from the center of the image to both eyes are hereinafter referred to as an image height and an image height difference, respectively. A face F1 is hardly tilted in the captured image and an image height difference between an image height R1 of a position of a right eye and an image height L1 of a position of a left eye is big. A face F2 is tilted in a radial direction toward the center of the captured image and an image height difference between an image height R2 of a position of a right eye and an image height L2 of a position of a left eye is small.

Due to the distortion aberration of lenses, distortion of left and right sides of a face in an image tends to get larger as an image height difference between positions of the both eyes from a distortion correction center which is the center of the image becomes bigger.

Further, distortion of a face tends to get larger as a position of the face is farther from the distortion correction center which is the center of the image.

In other words, as the image height difference from the distortion correction center which is the center of the image between positions of the both eyes is smaller and the position of the face is farther, the left and right sides of the face are largely distorted from equality. Conversely, since the slim face effect by the distortion correction is great, correction can be executed in a direction opposite to a direction in which the face is distorted to make the left and right sides of the face equal by executing strong correction and the slim face effect can be applied.

Figure 3:
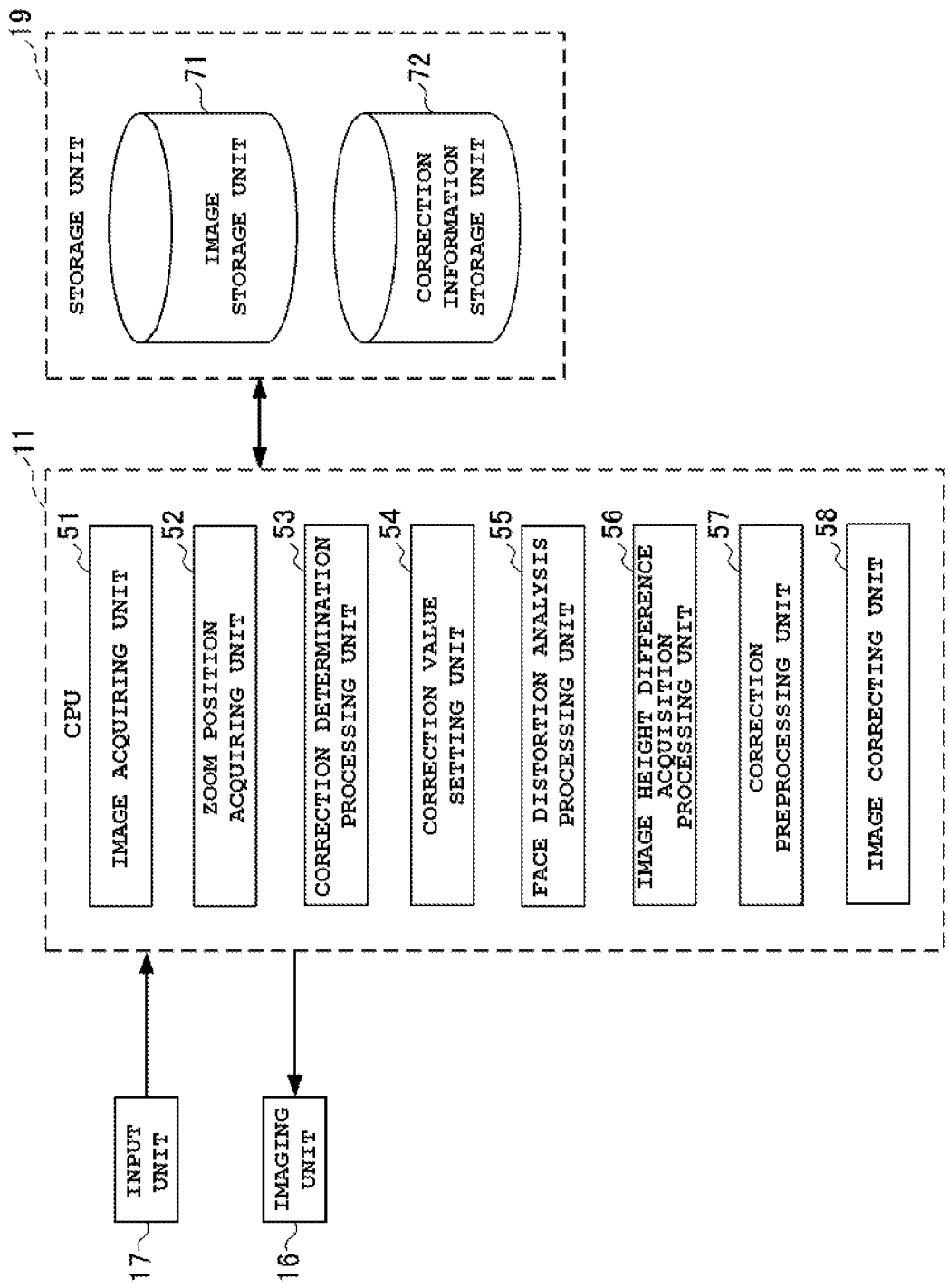
FIG. 3 is a functional block diagram showing a functional configuration of the imaging apparatus of FIG. 1 for executing a distortion correction process.

FIG. 3 is a functional block diagram showing a functional configuration of the imaging apparatus of FIG. 1 for executing a distortion correction process.

The "distortion correction process" means a series of actions taken in order to perform distortion correction by adding a correction intensity according to a distortion state determined from a distortion level of a face to a correction intensity corresponding to a correction value of the distortion correction set based on a zoom position. The "distortion correction process" includes a "correction determination process" and a "face distortion analysis process".

The "correction determination process" means a series of actions taken in order to determine whether or not to set a correction intensity according to a degree of distortion of a subject's face (hereinafter, referred to as a "face distortion level") based on whether or not there is a face, a continuous shooting mode is set, and/or there are one or more other special circumstances.

The "face distortion analysis process" means a series of actions taken in order to acquire a face distortion level based on an acquired image height difference and analyze face distortion levels of a plurality of faces to determine the maximum face distortion level. The "face distortion analysis process" includes an "image height difference acquisition process".

The "image height difference acquisition process" means a series of actions taken in order to acquire the image height difference based on information of positions of a plurality of detected eyes. The information of a position of an eye includes information of coordinate values of an area which is supposed to be an eye in the image and information of reliability showing a possibility that the area would be an eye (hereinafter, referred to as "reliability information").

To execute the distortion correction process, an image acquiring unit 51, a zoom position acquiring unit 52, a correction determination processing unit 53, a correction value setting unit 54, a face distortion analysis processing unit 55, an image height difference acquisition processing unit 56, a correction preprocessing unit 57, and an image correcting unit 58 of the CPU 11 function as shown in FIG. 3.

In an area of the storage unit 19, an image storage unit 71 and a correction information storage unit 72 are configured.

In the image storage unit 71, there is stored data of an image acquired from the imaging unit 16, an image acquired from the outside, and/or an image for which distortion correction has been performed (hereinafter, referred to as a "corrected image").

In the correction information storage unit 72, there is stored information to be used for processes relating to correction (hereinafter, referred to as "correction information"). The correction information includes correction values showing correction intensities of distortion correction each of which corresponds to each step of the zoom position, kinds of correction corresponding to the zoom positions (the correction values set based on the zoom positions), and information on the correction intensities for the face distortion levels according to the kinds of correction, for example.

To execute the distortion correction process, the image acquiring unit 51 acquires an image to which correction will be executed (hereinafter, referred to as a "target image") from the image storage unit 71.

In the case of using a captured image, the zoom position acquiring unit 52 acquires a value indicating zoom setting of the time when capturing the image. In the case of using an image acquired from the outside, the zoom position acquiring unit 52 acquires a zoom value stored in a header of the image, for example. Based on the acquired zoom value, the correction value is set to a value stored in the correction information storage unit 72. Further, the acquired zoom value is used as a criterion for determining whether or not the image is in a state in which the slim face effect can be easily achieved by correction (i.e. a lens property).

The correction determination processing unit 53 executes the correction determination process.

More specifically, the correction determination processing unit 53 determines whether or not a face is detected in the image because the image height difference acquisition process requires information of positions of eyes. In the case that a face is detected, it is determined by the correction determination processing unit 53 that adaptive correction is allowed to be performed.

Further, in the case that the distortion correction process is applied to each of images shot continuously while changing the correction intensity, directions of distortion of background are regarded as different between the images and, as a result, a series of the images after the correction do not look natural. In order to avoid this situation, the correction determination processing unit 53 determines whether or not a plurality of images were taken by the continuous shooting. In the case that a plurality of images were taken by the continuous shooting, it is determined by the correction determination processing unit 53 that the adaptive correction is not allowed to be performed for the plurality of images. On the other hand, in the case that a plurality of images were not taken by the continuous shooting, it is determined that the adaptive correction is allowed to be performed for the plurality of images.

Furthermore, the correction determination processing unit 53 determines whether or not there are one or more other special circumstances, for example, whether or not a shooting mode for a specific scene is set. In the case that there are no other special circumstances, it is determined by the correction determination processing unit 53 that the adaptive correction is allowed to be performed for the plurality of images.

For the correction determination process, the correction determination processing unit 53 detects a face by performing image analysis and, in the case that a face is detected, acquires position information of the face.

The correction value setting unit 54 sets the correction value of the distortion correction to a value corresponding to the zoom position acquired by the zoom position acquiring unit 52 by referring to the correction information storage unit 72.

Further, the correction value setting unit 54 sets the correction value according to the determination by the correction determination processing unit 53. In the case that it is determined by the correction determination processing unit 53 that the adaptive correction is allowed to be performed, the correction value setting unit 54 sets a wide angle of view to the limit in which vignetting is not introduced such as illumination in the four corners before performing the adaptive correction (more specifically, weakening barrel distortion correction) in order to prevent the angle of view in regions other than the four corners from being narrowed as a result of the barrel distortion correction. In the conventional distortion correction, the angle of view is set to have sufficient margin in order to prevent vignetting from being included by the distortion correction. However, in the case of performing the adaptive correction (more specifically, weakening barrel distortion correction), margin is taken to be less than that for the conventional distortion correction.

Here, the "barrel distortion correction" (hereinafter, referred to as a "first distortion correction") is a method used to correct barrel-type distortion aberration and means correction of an image of which sides are swollen for correcting the swell.

The face distortion analysis processing unit 55 executes the face distortion analysis process.

More specifically, the face distortion analysis processing unit 55 calculates the face distortion level based on the acquired image height difference of the positions of the both eyes and presents the maximum value of the face distortion level as a result of analysis.

The present embodiment is configured to present the maximum value of the face distortion level as the result of the analysis in order to prioritize proper processing of a face with the largest distortion in the case that there are a plurality of faces.

Here, a method for calculating the face distortion level is described.

The "Face Distortion Level" is given by the equation (1)

$$\text{Face Distortion Level} = \text{Image Height Difference of Both Eyes} \times \text{Coefficient 1} \times \text{Image Height of Eye farther from Center Coordinates of Image} \times \text{Coefficient 2} \quad (1)$$

where Coefficient 1 and Coefficient 2 are adjusting values used to adjust the face distortion level to comply with lens property and set based on the lens property according to distances of the eyes from the center of the image and/or inclination of the eyes.

The "Image Height Difference of Both Eyes" is given by the equation (3) based on image heights of the left and right eyes given by the equation (2).

$$\text{Image Height of Eye} = (\text{Position of Eye} - \text{Center Coordinates})/(\text{Length of Diagonal Line of Image}/2) \quad (2)$$

$$\text{Image Height Difference of Both Eyes} = |\text{Image Height of Right Eye} - \text{Image Height of Left Eye}| \quad (3)$$

The image height difference acquisition processing unit 56 executes the image height difference acquisition process.

More specifically, the image height difference acquisition processing unit 56 acquires information on a detected face (the position information and the reliability information of the face). In the present embodiment, three patterns of eye positions are detected as candidates for one detected face. Each of the candidates of eye positions is provided with the reliability information which is a value representing a degree of reliability.

Further, the image height difference acquisition processing unit 56 checks a difference in the reliability between a first candidate having the highest reliability and a second candidate having the next highest reliability (a first reliability check). In addition, the image height difference acquisition processing unit 56 checks the reliability of the eye positions (a second reliability check).

The image height difference acquisition processing unit 56 acquires the image height by the equation (2) for the position of each of the left and right eyes based on the acquired eye position information and calculates the value of the image height difference of the eyes by the equation (3).

The image height difference acquisition processing unit 56 determines that the minimum value of the calculated values of the image height difference is the "image height difference".

The correction preprocessing unit 57 determines the kind of distortion correction to be applied based on the zoom position acquired by the zoom position acquiring unit 52.

More specifically, the correction preprocessing unit 57 determines the kind of distortion correction to be applied which corresponds to the zoom position acquired by the zoom position acquiring unit 52 (in the present embodiment, the correction intensity set to correspond to the zoom position) by referring to the correction information storage unit 72.

In the case that the zoom position is on the wide angle side, a small face effect can be easily achieved due to the lens property. The correction preprocessing unit 57 determines the kind of distortion correction so that the first distortion correction should be applied.

On the other hand, in the case that the zoom position is on the zoom side, the small face effect cannot be easily achieved due to the lens property. The correction preprocessing unit 57 determines the kind of distortion correction so that correction other than the first distortion correction such as pincushion distortion correction should be applied.

The "pincushion distortion correction" (hereinafter, referred to as a "second distortion correction") is a method used to correct pincushion-type distortion aberration and means correction of an image of which sides are concave for correcting the concavity.

In the case that the correction preprocessing unit 57 determines the kind of distortion correction so that the first distortion correction should be applied, it executes a distortion correction intensity restraint process according to the face distortion level.

In the distortion correction intensity restraint process, a process for weakening the distortion correction is performed in the case that the face distortion level is a level in which distortion should be restrained (the face distortion level is near the maximum level of "255", i.e. the face distortion level is higher than or equal to a predetermined threshold value). On the other hand, no process for weakening the distortion correction is performed or a process for strengthening the distortion correction is performed in the case that the face distortion level is a level in which the small face effect should be actively applied (the face distortion level is near the minimum level of "0", i.e. the face distortion level is lower than a predetermined threshold value). Further, in the case that the face distortion level is in the direction of restraining the distortion and is the minimum level of "0", the correction intensity of the distortion correction is approximate to or the same as the correction value corresponding to the case where it is determined that the adaptive correction is not allowed.

On the other hand, in the case that the correction preprocessing unit 57 determines the kind of distortion correction so that correction other than the first distortion correction, such as the second distortion correction, should be applied, it executes a distortion correction intensity addition process to add the slim face effect according to the face distortion level.

In the distortion correction intensity addition process, in the case that the face distortion level is a level in which distortion should be restrained, no restraint process is performed and the correction intensity is not changed. On the other hand, in the case that the face distortion level is a level in which the small face effect should be actively applied, the distortion aberration of the pincushion type is corrected by the distortion correction and the correction intensity is strengthened so that the face is stretched. In other words, the slim face effect can be achieved by adding the correction intensity corresponding to the second distortion correction to the correction intensity corresponding to the set correction value because the face is stretched.

The image correcting unit 58 performs the distortion correction at a correction intensity corresponding to the correction value set by the correction value setting unit 54 or a correction value changed from the correction value set by the correction value setting unit 54 by the correction preprocessing unit 57.

More specifically, in the case that it is determined that the adaptive correction does not function properly when determining whether or not to perform the correction, the image correcting unit 58 performs the distortion correction at the correction intensity corresponding to the correction value set by the correction value setting unit 54.

Further, in the case that it is determined that the adaptive correction functions properly when determining whether or not to perform the adaptive correction, the image correcting unit 58 performs the distortion correction by using the value changed from the correction value set by the correction value setting unit 54.

More specifically, the image correcting unit 58 does not weaken the distortion correction or performs the distortion correction at a correction intensity corresponding to the correction value changed so that the distortion correction is not weakened or is strengthened according to the face distortion level, in the case that the slim face effect functions properly when the effect of the distortion correction can be easily achieved by the correction value based on the zoom position.

Further, the image correcting unit 58 performs the distortion correction at a correction intensity reduced by an amount of the first distortion correction to weaken the correction intensity according to the face distortion level, in the case that the slim face effect becomes improper when the effect of the distortion correction can be easily achieved by the correction value based on the zoom position.

Further, the image correcting unit 58 performs the distortion correction at a correction intensity corresponding to a correction value increased by an amount of the second distortion correction according to the face distortion level, in the case that the slim face effect becomes proper when the effect of the distortion correction cannot be easily achieved by the correction value based on the zoom position.

Further, the image correcting unit 58 performs the distortion correction at a correction intensity corresponding to the correction value of the state where the correction intensity is not changed, in the case that the slim face effect becomes improper when the effect of the distortion correction can be easily achieved by the correction value based on the zoom position.

Figure 4:
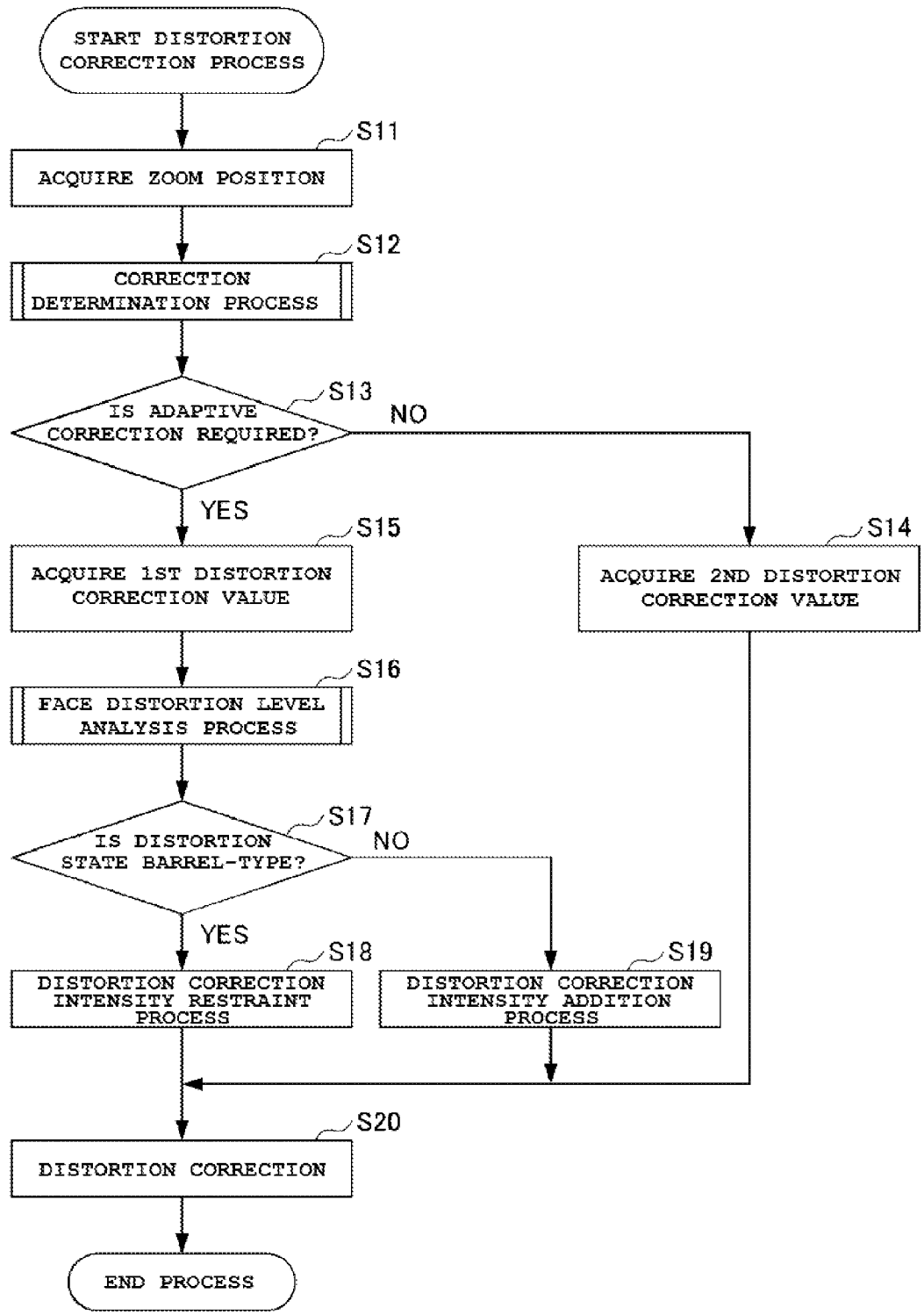
FIG. 4 is a flow chart for showing the distortion correction process executed by the imaging apparatus of FIG. 1 including the functional configuration shown in FIG. 3.

FIG. 4 is a flow chart for showing the distortion correction process executed by the imaging apparatus of FIG. 1 including the functional configuration shown in FIG. 3.

The distortion correction process is started by an operation to instruct to start the distortion correction process input to the input unit 17 by the user. For the distortion correction process, the image acquiring unit 51 acquired a target image.

At Step S11, the zoom position acquiring unit 52 acquires a zoom position of the time when shooting the target image in order to set a base value of the correction intensity. Based on the acquired zoom position, a corresponding correction value is obtained by referring the correction information storage unit 72.

At Step S12, the correction determination processing unit 53 executes the correction determination process. Based on the result of execution of the correction determination process, it is determined whether or not to perform the adaptive correction. The correction determination process will be described in more detail later.

At Step S13, the correction determination processing unit 53 determines whether or not the adaptive correction is required.

In the case that the adaptive correction is not required, the determination at Step S13 is "NO" and the process proceeds to Step S14.

At Step S14, the correction value setting unit 54 reads out the correction value of the distortion correction from the correction information storage unit 72 and acquires it as a second distortion correction value. Further, the correction value setting unit 54 sets the angle of view to a narrow one as "normal" so as to have margin of the normal distortion correction. Then, the process proceeds to Step S20. The Step S20 will be described later.

On the other hand, in the case that it is determined that the adaptive correction is required, the determination at Step S13 is "YES" and the process proceeds to Step S15.

At Step S15, the correction value setting unit 54 reads out the correction value of the distortion correction from the correction information storage unit 72 and acquires it as a first distortion correction value. In addition, the correction value setting unit 54 sets the angle of view to a wide one because positions of four corners of the image after correction are fixed and thus the angle of view is narrowed in regions other than the four corners of the image so that vignetting is not included in the four corners of the image in the case that the later first distortion correction other than the set value of aberration correction is weakened.

Further, in the case that the correction determination processing unit 53 determines that the adaptive correction will be performed, the correction value setting unit 54 previously sets the angle of view so as to broadened to the limit in which vignetting is not introduced such as illumination in the four corners in order to prevent the angle of view in regions other than the four corners from being narrowed as a result of the first distortion correction when the adaptive correction is performed (more specifically, the first distortion correction is weakened).

At Step S16, the face distortion analysis processing unit 55 executes the face distortion analysis process. As a result of execution of the face distortion analysis process, the maximum value of the face distortion level is acquired as an analysis result. The face distortion analysis process will be described in more detail later.

At Step S17, the correction preprocessing unit 57 determines a distortion state. In other words, the correction preprocessing unit 57 determines the kind of distortion correction to be applied based on the zoom position acquired by the zoom position acquiring unit 52. More specifically, the correction preprocessing unit 57 determines the state of distortion which corresponds to the zoom position acquired by the zoom position acquiring unit 52 (in the present embodiment, the correction value set to correspond to the zoom position) by referring to the correction information storage unit 72.

In the case that the zoom position is on the wide angle side, the small face effect can be easily achieved due to the lens property. Thus, the correction preprocessing unit 57 determines that the state of distortion is a state to which the first distortion correction should be applied.

On the other hand, in the case that the zoom position is on the zoom side, the small face effect cannot be easily achieved due to the lens property. Thus, the correction preprocessing unit 57 determines that the state of distortion is a state to which correction other than the first distortion correction such as the second distortion correction should be applied.

The "second distortion correction" is a method used to correct the pincushion-type distortion aberration and means correction of an image of which sides are concave for correcting the concavity.

In the case that the distortion state is the barrel-type, the determination at Step S17 is "YES" and the process proceeds to Step S18.

At Step S18, since the distortion state is determined to be the barrel-type, the correction preprocessing unit 57 performs the distortion correction intensity restraint process to set the correction value so as to restrain the distortion correction intensity.

In the distortion correction intensity restraint process, the correction intensity of the distortion correction is weakened in the case that the face distortion level is a level in which distortion should be restrained (the face distortion level is near the maximum level of "255", i.e. the face distortion level is higher than or equal to a predetermined threshold value).

On the other hand, the correction intensity of the distortion correction is not weakened or is strengthened in the case that the face distortion level is a level in which small face processing should be actively performed (the face distortion level is near the minimum level of "0", i.e. the face distortion level is lower than a predetermined threshold value). Further, in the case that the face distortion level is the minimum level of "0", the correction intensity of the distortion correction is approximate to or the same as the correction value corresponding to the case where it is determined that the adaptive correction is not allowed.

In the case that the distortion state is not the barrel-type but the pincushion-type, for example, the determination at Step S17 is "NO" and the process proceeds to Step S19.

At Step S19, since the distortion state is determined to be a type other than the barrel-type such as the pincushion-type, the correction preprocessing unit 57 performs the distortion correction intensity addition process to add the second distortion correction for the slim face effect.

More specifically, in the distortion correction intensity addition process, no action is taken and the correction value is not changed in the case that the face distortion level is a level in which distortion should be restrained (the face distortion level is near the maximum level of "255", i.e. the face distortion level is higher than or equal to a predetermined threshold value). On the other hand, in the case that the face distortion level is a level in which the small face effect should be actively applied (the face distortion level is near the minimum level of "0", i.e. the face distortion level is lower than a predetermined threshold value), the distortion aberration of the pincushion type is corrected by the distortion correction and the correction is performed so that the face is stretched. In other words, the slim face effect can be achieved because the face is corrected to be stretched more strongly by adding the correction value corresponding to the second distortion correction to the correction value which is the set correction intensity.

At Step S20, the image correcting unit 58 performs the distortion correction for the target image based on whether or not the adaptive correction is allowed to be performed, if the small face effect can be easily achieved according to the zoom position, and a degree of the face distortion level in which the slim face effect becomes proper.

More specifically, in the case that it is determined that the distortion state is the barrel-type and the face distortion level is a level in which distortion should be restrained (the face distortion level is near the maximum level of "255"), the image correcting unit 58 performs the distortion correction at a correction intensity for weakening the distortion correction. On the other hand, in the case that the face distortion level is a level in which the small face effect should be actively applied (the face distortion level is near the minimum level of "0"), the image correcting unit 58 does not weaken the distortion correction or performs the distortion correction at a strengthened correction intensity.

In the case that the distortion state is determined to be a type other than the barrel-type, such as the pincushion-type, and the face distortion level is a level in which distortion should be restrained (the face distortion level is near the maximum level of "255"), the image correcting unit 58 performs the distortion correction by the distortion correction intensity addition process without restraining the correction intensity. On the other hand, in the case that the face distortion level is a level in which the small face effect should be actively applied (the face distortion level is near the minimum level of "0"), the image correcting unit 58 corrects the distortion aberration of the pincushion type by the distortion correction and performs the distortion correction at a correction intensity at which the face is stretched.

After that, the distortion correction process is ended.

Figure 5:
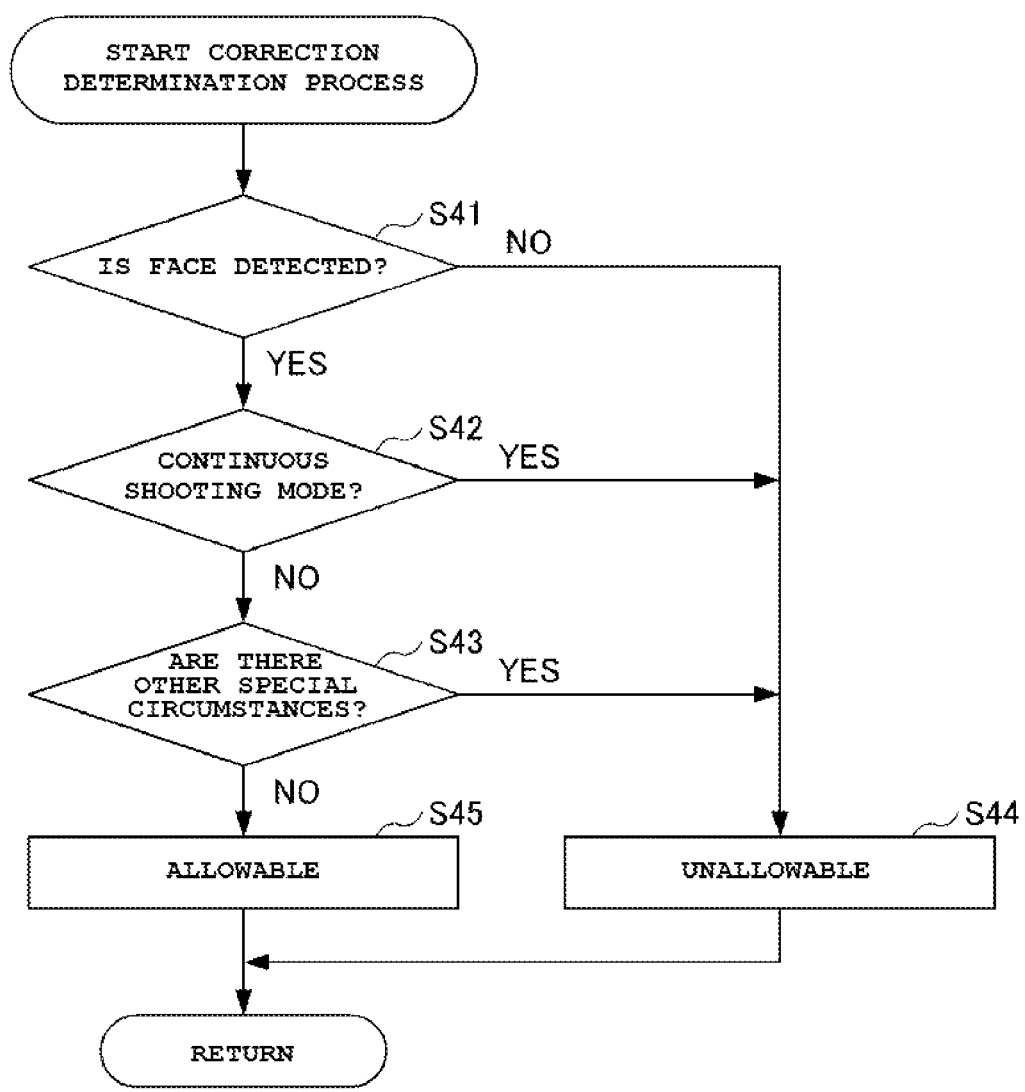
FIG. 5 is a flow chart for showing a correction determination process in the distortion correction process.

FIG. 5 is a flow chart for showing the correction determination process in the distortion correction process.

At Step S41, the correction determination processing unit 53 determines whether or not a face is detected in order to use positions of eyes for face distortion analysis.

In the case that it is determined that no face is detected, the determination at Step S41 is "NO" and the process proceeds to Step S44. Step S44 and subsequent steps will be described later.

In the case that it is determined that a face is detected, the determination at Step S41 is "YES" and the process proceeds to Step S42.

At Step S42, the correction determination processing unit 53 determines whether or not the shooting mode is the continuous shooting mode in order to prevent continuous images from being unnatural.

In the case that the shooting mode is the continuous shooting mode, the determination at Step S42 is "YES" and the process proceeds to Step S44.

In the case that the shooting mode is not the continuous shooting mode, the determination at Step S42 is "NO" and the process proceeds to Step S43.

At Step S43, the correction determination processing unit 53 determines whether or not there are one or more other special circumstances.

In the case that there are one or more other special circumstances, the determination at Step S43 is "YES" and the process proceeds to Step S44.

At Step S44, the correction determination processing unit 53 determines that the adaptive correction will not be performed (i.e. the adaptive correction is "UNALLOWABLE") because no face is detected, the shooting mode is the continuous shooting mode, or there are one or more other special circumstances.

On the other hand, in the case that there are no other special circumstances, the determination at Step S43 is "NO" and the process proceeds to Step S45.

At Step S45, the correction determination processing unit 53 determines that the adaptive correction will be performed (i.e. the adaptive correction is "ALLOWABLE") because a face is detected, the shooting mode is not the continuous shooting mode, and there are no other special circumstances.

After that, the process returns to the distortion correction process.

Figure 6:
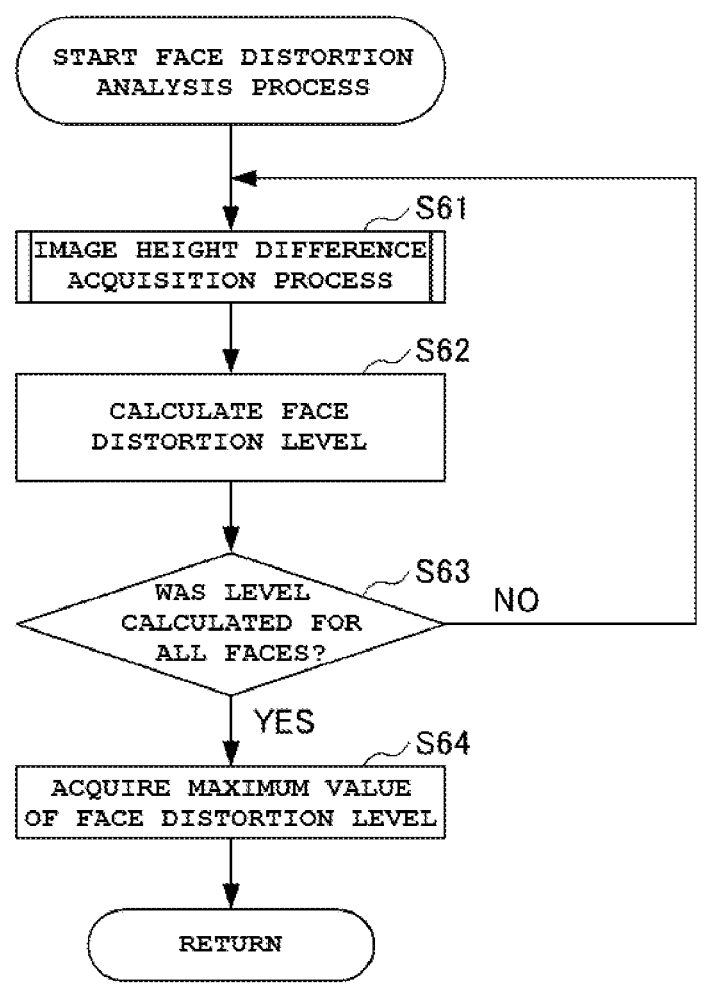
FIG. 6 is a flow chart for showing a face distortion analysis process in the distortion correction process.

FIG. 6 is a flow chart for showing the face distortion analysis process in the distortion correction process.

At Step S61, the face distortion analysis processing unit 55 executes the image height difference acquisition process. As a result of execution of the image height difference acquisition process, the image height difference of both eyes for a detected face is acquired. The image height difference acquisition process will be described in more detail later.

At Step S62, the face distortion analysis processing unit 55 calculates the face distortion level.

The face distortion level is calculated by the equation (1).

At Step S63, the face distortion analysis processing unit 55 determines whether or not the face distortion level was calculated for all of detected faces.

In the case that the face distortion level was not calculated for all of the detected faces, the determination at Step S63 is "NO" and the process returns to Step S61.

In the case that the face distortion level was calculated for all of the detected faces, the determination at Step S63 is "YES" and the process returns to Step S64.

At Step S64, the face distortion analysis processing unit 55 acquires the maximum value of the acquired face distortion levels as a result of the analysis of the face distortion level. After that, the process returns to the distortion correction process.

FIG. 7 is a flow chart for showing the image height difference acquisition process in the distortion correction process.

At Step S81, the image height difference acquisition processing unit 56 acquires information on the detected face (the position information and the reliability information). In the present embodiment, three patterns of eye positions are detected for one detected face. Each of the detected eye positions is provided with the reliability information which is a value representing a degree of reliability at which the detected pattern is the eyes.

At Step S82, the image height difference acquisition processing unit 56 determines whether or not the difference in the reliability between a first candidate having the highest reliability and a second candidate having the next highest reliability is larger than or equal to a predetermined threshold value (a first reliability check).

In the case that the difference in reliability is larger than or equal to the threshold value, the determination at Step S82 is "YES" and the process proceeds to Step S88. Step S88 will be described later.

In the case that the difference in reliability is smaller than the threshold value, the determination at Step S82 is "NO" and the process proceeds to Step S83.

At Step S83, the image height difference acquisition processing unit 56 acquires the image height for each of the left and right eyes. The image height difference acquisition processing unit 56 calculates the image height by the equation (2).

At Step S84, the image height difference acquisition processing unit 56 calculates an absolute value of the difference of the image height of the right eye and the image height of the left eye by using the equation (3).

At Step S85, the image height difference acquisition processing unit 56 holds the minimum image height difference as a candidate.

At Step S86, the image height difference acquisition processing unit 56 determines whether or not the reliability of the eye positions is higher than or equal to a predetermined threshold value (a second reliability check).

In the case that it is determined that the reliability is higher than or equal to the threshold value, the determination at Step S86 is "YES" and the process proceeds to Step S88.

In the case that it is determined that the reliability is lower than the threshold value, the determination at Step S86 is "NO" and the process proceeds to Step S87.

At Step S87, the image height difference acquisition processing unit 56 determines whether or not the process was executed for the whole of the detected face. In the present embodiment, it is determined whether or not the process was executed for the three patterns of eye positions.

In the case that it is not determined that the process was executed for the whole of the face, the determination at Step S87 is "NO" and the process returns to Step S81.

In the case that it is determined that the process was executed for the whole of the face, the determination at Step S87 is "YES" and the process proceeds to Step S88.

At Step S88, the image height difference acquisition processing unit 56 determines that the minimum image height difference is the image height difference in the case that the reliability of the first candidate is higher than or equal to a threshold value, the reliability of the eye positions is higher than or equal to a threshold value, or the process was executed for the whole of the detected face. After that, the process returns to the distortion correction process.

The imaging apparatus 1 configured as described above includes the image acquiring unit 51, the image correcting unit 58, and the correction preprocessing unit 57.

The image acquiring unit 51 acquires an image.

The image correcting unit 58 performs distortion correction for the image acquired by the image acquiring unit 51.

The correction preprocessing unit 57 determines an inclination of a face of a person in the image acquired by the image acquiring unit 51.

Further, the correction preprocessing unit 57 controls the image correcting unit 58 to perform distortion correction for the image at an intensity according to the determined inclination of the face.

Thus, according to the imaging apparatus 1 of the embodiments, it is possible to perform image correction suiting a user's taste according to situations of a subject's image in the photographic range because the image correcting unit 58 performs distortion correction of the image at an intensity according to the determined inclination of the face.

In some embodiments, the correction preprocessing unit 57 selects an intensity of the distortion correction by the image correcting unit 58 based on the determined inclination of the face.

Further, the correction preprocessing unit 57 controls the image correcting unit 58 to perform the distortion correction of the image at the selected intensity.

By this, according to the imaging apparatus 1 of the embodiments, it is possible to perform the image correction suiting the user's taste according to the situations of the subject's image in the photographic range because the image correcting unit 58 performs the distortion correction of the image at the intensity selected from the plurality of candidates.

In some embodiments, the imaging apparatus 1 further includes the correction determination processing unit 53 for detecting positions of two eyes of the person in the image acquired by the image acquiring unit 51.

The correction preprocessing unit 57 determines the inclination of the face based on the positions of the two eyes detected by the correction determination processing unit 53.

By this, according to the imaging apparatus 1 of the embodiments, it is possible to determine the inclination of the face with high accuracy because the determination is based on the positions of the two eyes.

In some embodiments, the imaging apparatus 1 includes the image height difference acquisition processing unit 56 for acquiring a difference between distances from the detected positions of the two eyes to the center of the image.

The correction preprocessing unit 57 determines the inclination of the face based on the distance difference acquired by the image height difference acquisition processing unit 56.

By this, according to the imaging apparatus 1 of the embodiments, it is possible to determine the inclination of the face with high accuracy because the determination is based on the difference between the distances from the detected positions of the two eyes to the center of the image.

The correction preprocessing unit 57 determines whether or not the acquired distance difference is smaller than a predetermined threshold value.

Based on the determination, the correction preprocessing unit 57 determines the inclination of the face.

By this, according to the imaging apparatus 1 of the embodiments, it is possible to determine the inclination of the face with high accuracy because the determination is based on whether or not the distance difference is smaller than the predetermined threshold value.

The correction preprocessing unit 57 controls the image correcting unit 58 to perform the distortion correction at a predetermined intensity in the case that it is determined that the distance difference is smaller than the predetermined threshold value. On the other hand, in the case that it is determined that the distance difference is not smaller than the predetermined threshold value, the correction preprocessing unit 57 controls the image correcting unit 58 to perform the distortion correction at an intensity lower than the predetermined intensity.

By this, according to the imaging apparatus 1 of the embodiments, it is possible to perform the image correction proper to the declination of the face.

In some embodiments, the correction preprocessing unit 57 determines inclinations of faces of a plurality of persons in the image and controls the image correcting unit 58 to perform the distortion correction at an intensity corresponding to a face having the largest distortion based on the determined inclinations of the plurality of faces.

By this, according to the imaging apparatus 1 of the embodiments, the distortion correction is performed while giving priority to a face having the smallest inclination of the plurality of faces, thereby preventing other faces from becoming unnatural by the distortion correction.

In some embodiments, the imaging apparatus 1 includes the zoom position acquiring unit 52 for acquiring a state of the time when shooting the image.

The correction preprocessing unit 57 changes the degree of the distortion correction of the image by the image correcting unit 58 based on a zoom position of the time when shooting the image acquired by the zoom position acquiring unit 52.

By this, according to the imaging apparatus 1 of the embodiments, it is possible to further consider a shooting situation by strengthening the distortion correction in the case that the shooting situation is proper to the distortion correction, for example, and perform the image correction suiting the user's taste according to the situations of the subject's image in the photographic range.

In some embodiments, the imaging apparatus 1 includes the image acquiring unit 51, the image correcting unit 58, the correction determination processing unit 53, the image height difference acquisition processing unit 56, and the correction preprocessing unit 57.

The image acquiring unit 51 acquires an image.

The image correcting unit 58 performs distortion correction for the image acquired by the image acquiring unit 51.

The correction determination processing unit 53 detects positions of two eyes of a person in the image acquired by the image acquiring unit 51.

The image height difference acquisition processing unit 56 acquires a difference between distances from the positions of the two eyes detected by the correction determination processing unit 53 to a predetermined position of the image.

The correction preprocessing unit 57 determines whether or not the distance difference acquired by the image height difference acquisition processing unit 56 is smaller than a predetermined threshold value.

The correction preprocessing unit 57 controls the image correcting unit 58 to perform the distortion correction at a predetermined intensity in the case that it is determined that the distance difference is smaller than the predetermined threshold value. On the other hand, in the case that it is determined that the distance difference is bigger than or equal to the predetermined threshold value, the correction preprocessing unit 57 controls the image correcting unit 58 not to perform the distortion correction.

By this, the imaging apparatus 1 according to the embodiments determines the inclination of the face and performs distortion correction based on the difference between the distances from the positions of the two eyes to the center position of the image thereby performing the image correction proper to the declination of the face. Thus, it is possible to perform the image correction suiting the user's taste according to the situations of the subject's image in the photographic range.

In addition, the present invention is not limited to the embodiments described above and various modifications and alternatives which can achieve the objects of the invention fall within the scope of the present invention.

In the embodiments described above, the method for determining the inclination of the face is based on the image height difference. However, in another embodiment, the inclination may be determined based on template matching, the center line of the two eyes, or the like.

Further, in the embodiments described above, in the case that the face distortion level is in the direction of restraining the distortion and is the minimum level of "0", the correction intensity of the distortion correction is approximate to or the same as the correction value corresponding to the case where it is determined that the adaptive correction is not allowed. Thus, the margin may be adjusted so that the angle of view can be the same as or approximate to that of the normal state.

In another embodiment, the degree of the distortion correction is changed based on a position of the face in the image such as an upper part, a middle part, a lower part, or an end of the image.

Further, in the embodiments described above, the present invention has been applied to a digital camera as an example of the imaging apparatus 1 without limitation.

For example, the present invention can be applied to general electronic devices having the function of distortion correction processing. More specifically, the present invention can be applied to a notebook type personal computer, a printer, a television, a video camera, a portable navigation device, a mobile phone, a smart phone, a portable game device, and the like.

Each of the process sequences described above can be executed by hardware or software.

In other words, the functional configuration shown in FIG. 3 is merely an example and the present invention is not limited thereto. The imaging apparatus 1 suffices if it has a function for performing the process sequence as a whole. Functional blocks to use to implement this function are not limited to the embodiment of FIG. 3.

In addition, a functional block may be configured by a piece of hardware, a piece of software, or their combination.

In the case that the sequence is performed by software, a program configuring the software is installed in a computer or the like from a network or a storage medium.

The computer may be a computer which is incorporated in dedicated hardware. In addition, the computer may be a computer capable of executing various functions by installing various programs therein, for example, a general-purpose personal computer.

A storage medium for recording such a program may include not only the removable media 31 shown in FIG. 1 which is distributed separately from the apparatus's main body to provide it to users, but also a storage medium or the like which is provided to users in a state of being incorporated in the apparatus's main body in advance. The removable media 31 includes, for example, a magnetic disk (including a floppy disk), an optical disc, a magneto-optical disk, or the like. For example, the optical disc includes a compact disk-read only memory (CD-ROM), a digital versatile disk (DVD), a Blu-ray (Registered Trademark) disc, or the like. The magneto-optical disk includes a Mini-Disk (MD), or the like. In addition, the storage medium which is provided to the users in a state of being incorporated in the apparatus's main body in advance includes, for example, the ROM 12 in FIG. 1 in which a program is recorded, a hard disk included in the storage unit 19 in FIG. 1, or the like.

Further, in the description presented here, the steps describing a program recorded in a recording medium include not only processes to be executed serially in time in order, but also processes which are not necessarily executed serially in time but in a parallel manner or individually.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image correcting apparatus comprising:
a processor that executes instructions to perform operations, comprising:
acquiring an image;
performing distortion correction for the image;
determining an inclination of a face of a person in the image;
performing distortion correction for the image at an intensity according to the inclination of the face;
detecting positions of two eyes of the person in the image, wherein the first determining section determines the inclination of the face based on the positions of the two eyes detected; and
calculating a difference between distances from the positions of the two eyes to the center position of the image, wherein determining the inclination of the face based on the distance difference calculated,
wherein determining comprises determining whether or not the distance difference calculated is smaller than a predetermined threshold value, and determining the inclination of the face based on determining whether or not the distance difference calculated is smaller than a predetermined threshold value.

2. The image correcting apparatus of claim 1 further comprising selecting an intensity of the distortion correction based on the inclination of the face determined,
and performing the distortion correction for the image at the intensity selected.

3. The image correcting apparatus of claim 2, wherein performing the distortion correction at a predetermined intensity in the case that determining whether or not the distance difference calculated is smaller than a predetermined threshold value, and performing the distortion correction at an intensity lower than the predetermined intensity in the case that the determining that the distance difference is not smaller than the predetermined threshold value.

4. The image correcting apparatus of claim 2, wherein determining comprises determining inclinations of faces of a plurality of persons in the image, and
performing the distortion correction for the image at an intensity corresponding to a face having the largest distortion based on the inclinations of the plurality of faces determined.

5. The image correcting apparatus of claim 2, wherein performing distortion correction at a predetermined intensity in the case that determining that the distance difference is smaller than the predetermined threshold value, and not performing distortion correction in the case that the determining that the distance difference is bigger than or equal to the predetermined threshold value.

6. An image correcting apparatus comprising:
a processor that executes instructions to perform operations, comprising:
acquiring an image;
performing distortion correction for the image;
determining an inclination of a face of a person in the image;
performing distortion correction for the image at an intensity according to the inclination of the face determined; and
acquiring a state of the time when shooting the image,
wherein performing distortion correction changes the degree of the distortion correction for the image based on the state of the time when shooting the image.

7. The image correcting apparatus of claim 6 further comprising selecting an intensity of the distortion correction based on the inclination of the face determined, and performing distortion correction for the image at the intensity selected.

8. The image correcting apparatus of claim 6, wherein determining comprises determining inclinations of faces of a plurality of persons in the image, and
performing the distortion correction for the image at an intensity corresponding to a face having the largest distortion based on the inclinations of the plurality of faces determined.

9. An image correcting method comprising:
(a) acquiring an image;
(b) performing distortion correction for the acquired image;
(c) determining an inclination of a face of a person in the acquired image;
(d) performing distortion correction for the image at an intensity according to the determined inclination of the face;
(f) detecting positions of two eyes of the person in the acquired image; and
(g) calculating a difference between distances from the detected positions of the two eyes to the center position of the image,
wherein step (c) comprises determining the inclination of the face based on the calculated distance difference and on the detected positions of the two eyes,
wherein step (c) comprises determining whether or not the calculated distance difference is smaller than a predetermined threshold value and determining the inclination of the face based on the determination of whether or not the calculated distance difference is smaller than the predetermined threshold value.

10. The image correcting method of claim 9 further comprising (e) selecting an intensity of the distortion correction based on the determined inclination of the face,
wherein step (d) comprises performing control so that the distortion correction is performed for the image at the selected intensity.

11. A non-transitory computer-readable recording medium for recording a program readable by a computer, the program causing the computer to perform steps of:
(a) acquiring an image;
(b) performing distortion correction for the acquired image;
(c) determining an inclination of a face of a person in the acquired image based on the detected positions of the two eyes and on the calculated distance difference;
(d) performing distortion correction for the image at an intensity according to the determined inclination of the face;
(f) detecting positions of two eyes of the person in the acquired image;
(g) calculating a difference between distances from the detected positions of the two eyes to the center position of the image,
wherein step (c) comprises determining whether or not the calculated distance difference is smaller than a predetermined threshold value and determining the inclination of the face based on the determination of whether or not the calculated distance difference is smaller than the predetermined threshold value.

12. The non-transitory computer-readable recording medium of claim 11, wherein the program causes the computer to further perform a step of (e) selecting an intensity of the distortion correction based on the determined inclination of the face, and step (d) comprises performing control so that the distortion correction is performed for the image at the selected intensity.

13. An image correcting method comprising:

acquiring an image;

performing distortion correction for the image;

determining an inclination of a face of a person in the image;

performing distortion correction for the image at an intensity according to the determined inclination of the face; and acquiring a state of the time when shooting the image, wherein performing distortion correction comprises changing the degree of the distortion correction for the image based on the state of the time when shooting the image.

14. A non-transitory computer-readable recording medium for recording a program readable by a computer, the program causing the computer to perform:

acquiring an image;

performing distortion correction for the image;

determining an inclination of a face of a person in the image;

performing distortion correction for the image at an intensity according to the determined inclination of the face; and acquiring a state of the time when shooting the image, wherein performing distortion correction comprises changing the degree of the distortion correction for the image based on the state of the time when shooting the image.

* * * * *